United States Patent
Baskis et al.

(10) Patent No.: US 7,387,733 B2
(45) Date of Patent: Jun. 17, 2008

(54) SYSTEM AND METHOD FOR PROCESSING ORGANIC WASTE MATERIAL

(75) Inventors: Paul Thomas Baskis, Rantoul, IL (US); Keith Atkinson, Norcross, GA (US); Windell Camanse, Lexington, KY (US); Glen Neustedter, Lake St. Louis, MO (US); F. David Mullinix, Rantoul, IL (US)

(73) Assignee: Baswood, LLC, Atlanta, GA (US)

( * ) Notice: Subject to any disclaimer, the term of this patent is extended or adjusted under 35 U.S.C. 154(b) by 273 days.

(21) Appl. No.: 11/294,777

(22) Filed: Dec. 6, 2005
(Under 37 CFR 1.47)

(65) Prior Publication Data
US 2006/0096916 A1     May 11, 2006

Related U.S. Application Data

(63) Continuation-in-part of application No. 10/735,516, filed on Dec. 11, 2003, now Pat. No. 7,144,507.

(51) Int. Cl.
*C02F 3/30* (2006.01)
(52) U.S. Cl. .................. 210/605; 210/612; 210/620
(58) Field of Classification Search ............... 210/605, 210/612, 615–617, 620
See application file for complete search history.

(56) References Cited

U.S. PATENT DOCUMENTS

| | | | |
|---|---|---|---|
| 1,434,520 A | 11/1922 | Ball | |
| 2,823,106 A | 2/1958 | Pierson | |
| 2,867,521 A | 1/1959 | Jeffreys | |
| 4,655,925 A | 4/1987 | Tabata et al. | |
| 4,818,405 A | 4/1989 | Vroom et al. | |
| 4,917,805 A | 4/1990 | Reid | |
| 5,076,928 A | 12/1991 | Ballnus | |
| 5,545,327 A | 8/1996 | Volland | |
| 5,558,774 A | 9/1996 | Tonelli et al. | |
| 5,647,986 A | 7/1997 | Nawathe et al. | |
| 5,725,770 A | 3/1998 | Henry | |
| 5,863,433 A | 1/1999 | Behrends | |
| 5,989,428 A | 11/1999 | Goronszy | |

(Continued)

FOREIGN PATENT DOCUMENTS

| | | |
|---|---|---|
| JP | 07-308688 | 11/1995 |
| JP | 08-224590 | 9/1996 |
| WO | PCT/US2006/061019 | 10/2007 |

*Primary Examiner*—Fred Prince
(74) *Attorney, Agent, or Firm*—Hunton & Williams LLP

(57) ABSTRACT

A method is provided for maintaining a biomass disposed on a substrate in a bioreactor tank. The bioreactor tank has an inlet and an outlet in fluid communication with a waste treatment system whereby an influent fluid may be selectively introduced through the inlet into the bioreactor tank for removal of waste material therefrom. This produces an effluent fluid which can be returned through the outlet to the waste treatment system. The method comprises processing a quantity of influent fluid through the bioreactor tank to produce a quantity of effluent fluid and removing the effluent fluid from the bioreactor tank through the outlet. The method further comprises isolating the bioreactor tank from the waste treatment system and establishing a set of dry cycle conditions in the bioreactor tank. The dry cycle conditions are selected to effect endogenous growth within at least a portion of the biomass whereby an average age of the at least a portion of the biomass may be tailored. The method also comprises restoring the bioreactor tank connection to the waste treatment system.

19 Claims, 6 Drawing Sheets

U.S. PATENT DOCUMENTS

| | | |
|---|---|---|
| 6,065,224 A | 5/2000 | Eigner |
| 6,153,099 A | 11/2000 | Weis |
| 6,224,041 B1 | 5/2001 | Rebori et al. |
| 6,299,774 B1 | 10/2001 | Ainsworth et al. |
| 6,319,406 B1 * | 11/2001 | Freshour et al. ............ 210/609 |
| 6,325,935 B1 | 12/2001 | Hojsgaard |
| 7,144,507 B2 | 12/2006 | Baskis |
| 2001/0047960 A1 | 12/2001 | Sato et al. |
| 2004/0063193 A1 | 4/2004 | Suominen |
| 2006/0011757 A1 | 1/2006 | Palm |

\* cited by examiner

SYSTEM AND METHOD FOR PROCESSING ORGANIC WASTE MATERIAL

This application is a continuation-in-part of U.S. patent application Ser. No. 10/735,516, filed Dec. 11, 2003, now U.S. Pat. No. 7,144,507, which is incorporated herein by reference in its entirety.

FIELD OF THE INVENTION

Embodiments of the invention relate to the treatment of waste organic matter, such as wastewater and sludge. More specifically, the invention relates to a method of maintaining a biomass adapted for removing of organic waste matter from a fluid and processing systems adapted to use this method.

BACKGROUND OF THE INVENTION

Waste organic matter including that found in raw wastewater (i.e., sewage), sludge from sewage treatment facilities, farm waste, organic industrial waste, leachate, and so forth is a principle cause of water pollution. Therefore, waste organic matter from these and other sources ideally is treated before release into the environment in order to reduce or eliminate the presence of environmentally harmful organic compounds.

Waste organic matter comprises a variety of organic constituents, including, but not limited to, cellulose, hemicellulose, lingin, polysaccharides such as starch and chitin, proteins, lipids such as triacylglycerols and phospholipids, pesticides, fungicides, polymers, petroleum wastes, and other long-chain or complicated hydrocarbons. One way in which waste organic matter may be treated is by breaking down the organic molecules into simpler, non-toxic or environmentally-friendly constituent parts via digestion or metabolism (i.e., decomposition) by various microorganisms.

Microorganisms recognized for their ability to break down organic matter include, but are not limited to, bacteria, actinomycetes, yeast, algae, and protozoa. Generally, organic matter is broken down into simpler constituent parts by the action of enzymes released by the microorganisms. During this process, some of the carbonaceous material of the organic matter may be consumed in the formation of new microbial tissue. Additionally, some of the carbonaceous material may be consumed in the production of carbon dioxide ($CO_2$) and methane ($CH_4$) gases, which may be subsequently released into the environment, flared, burned for energy production purposes, and so on. In this manner, the organic waste may be broken down into smaller, non-toxic molecules that are then incorporated into the growing biomass of the microorganisms or released as gasses. For example, industrial waste management processes like publicly owned treatment facilities (POTWs) often utilize microorganisms, in particular bacteria, to break down waste organic matter.

The description herein of problems and disadvantages of known apparatuses, methods, and devices is not intended to limit the invention to the exclusion of these known entities. Indeed, embodiments of the invention may include one or more of the known apparatus, methods, and devices without suffering from the disadvantages and problems noted herein.

SUMMARY OF THE INVENTION

What is needed is an improved method to maintain a biomass for purposes of digesting, metabolizing, or processing waste organic matter. What also is needed is an improved waste treatment process for the digestion of cellulose and hemicellulose. Additionally, a method to prevent or reduce the likelihood of sloughing of biomass from a bioreactor is needed. Embodiments of the invention solve some or all of these needs, as well as additional needs.

An aspect of the invention provides a method of maintaining a biomass disposed on a substrate in a bioreactor tank. The bioreactor tank has an inlet and an outlet in fluid communication with a waste treatment system whereby an influent fluid may be selectively introduced through the inlet into the bioreactor tank for removal of waste material therefrom. This produces an effluent fluid which can be returned through the outlet to the waste treatment system. The method comprises processing a quantity of influent fluid through the bioreactor tank to produce a quantity of effluent fluid and removing the effluent fluid from the bioreactor tank through the outlet. The method further comprises isolating the bioreactor tank from the waste treatment system and establishing a set of dry cycle conditions in the bioreactor tank. The dry cycle conditions are selected to effect endogenous growth within at least a portion of the biomass whereby an average age of the at least a portion of the biomass may be tailored. The method also comprises restoring the bioreactor tank connection to the waste treatment system.

These and other features and advantages of the embodiments will be apparent from the description provide herein.

DETAILED DESCRIPTION OF THE EMBODIMENTS

The following description is intended to convey a thorough understanding of the various embodiments of the invention by providing a number of specific embodiments and details involving the digesting, metabolizing, or treatment waste organic matter. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments.

Waste organic matter may be metabolized, or broken down, into constituent parts by the action of microorganisms that use the compounds liberated by the metabolism as nutrients. Microorganisms such as bacteria, actinomycetes, yeast, algae, and protozoa are recognized for their ability to metabolize cellulose, hemicellulose, lingin, polysaccharides such as starch and chitin, proteins, lipids such as triglycerols and phospholipids, pesticides, fungicides, polymers, petroleum wastes, and other long-chain or complicated hydrocarbons that may be found in waste organic matter. Therefore, providing an environment wherein appropriate microorganisms may thrive and introducing waste organic matter to that environment may be used to treat or process the waste organic matter. Preferably, the results of the metabolism of the waste organic matter by the microorganisms are simpler, environmentally-friendly organic compounds, water or gases such as carbon dioxide ($CO_2$) and methane ($CH_4$), and energy.

A bioreactor may be used to effect the metabolism of waste organic matter by microorganisms. Waste organic matter and other nutrients (i.e., water and oxygen) may be introduced into the reactor. The microorganisms inside of the reactor metabolize the waste organic matter, in effect treating or processing it. Biological media disposed inside the reactor are used to provide a substrate for the microorganisms to adhere to and form the biofilms and other structures that may be necessary for their propagation. Collectively, the microorganisms may be referred to as the "biomass" of the reactor.

Figure 1:
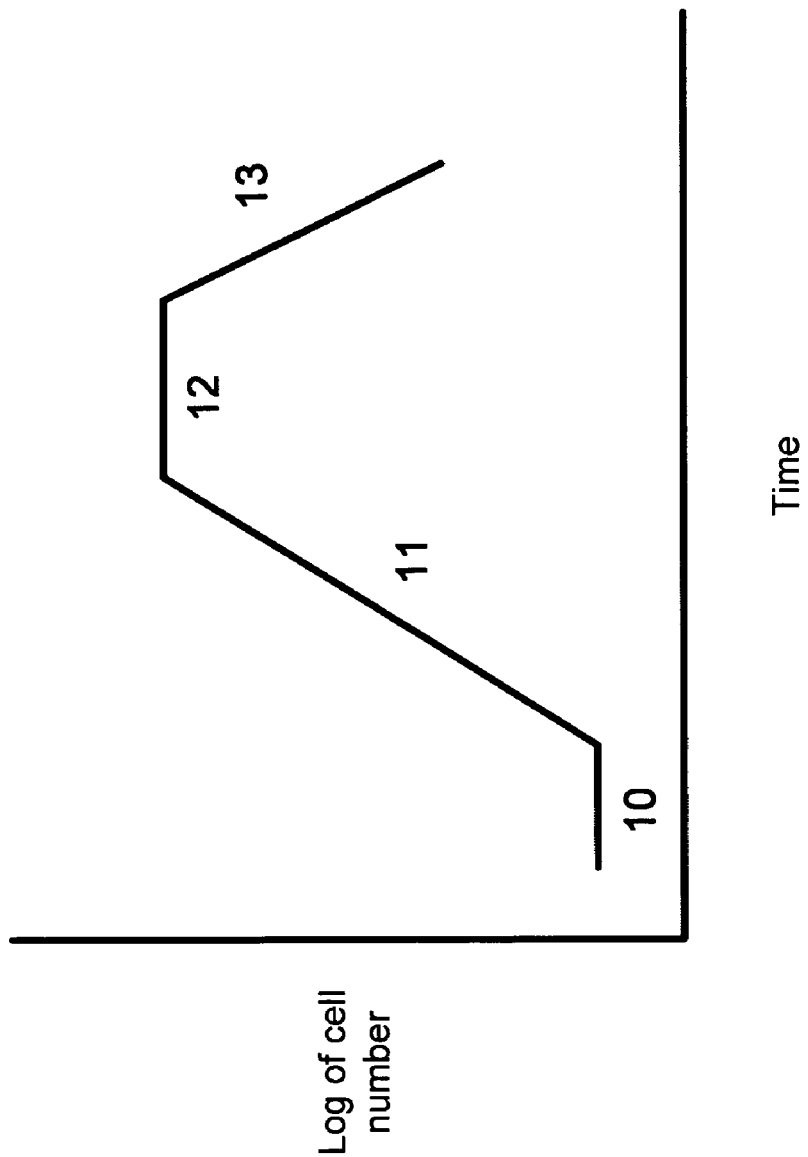
FIG. 1 is a graph showing the time (x-axis) versus the log of the number of microorganisms (y-axis) of a typical biomass at various growth stages.

A typical biomass undergoes a multi-stage growth cycle as is illustrated in FIG. 1. The growth cycle comprises a lag stage 10, a logarithmic growth (log) stage 11, a stationary or fixed stage 12, and a decline stage 13. In the lag stage, the biomass establishes itself in its environment and seeks to form the biofilms and other structures that allow the biomass to organize and propagate. In the log stage, logarithmic growth of the biomass is observed as the microorganisms incorporating the biomass assimilate material from their environment (e.g., waste organic matter, oxygen, nitrogen, phosphorus, potassium, and sulfur in fluids surrounding the biomass) to grow and propagate. In the stationary or fixed stage, the biomass reaches a maximum quantity or size as constrained by environmental pressures such as the surface area of the substrate on which the biomass is fixed and the quantity of metabolizable compounds in the environment. In the decline stage, the biomass begins to decrease in quantity. Though not desiring to be limited thereto, it is thought that sustained damage to the microorganisms and biofilms that incorporate the biomass eventually decreases the biomass's ability to assimilate nutrients from its environment, leading to the degradation of the biomass observed in the decline stage. Specifically, in the case of a bacterial biomass, it has been observed that damage to the membranes of bacteria over time reduce their ability to assimilate nutrients from the environment, thereby leading to a decline in the biomass.

The life cycle shown in FIG. 1 tends to cause a drop in waste treatment performance in traditional bioreactors because of the drop in digestion as the biomass goes into decline. Additionally, the biomass in previous bioreactors tend exhibit sloughing behavior. "Sloughing" refers to the tendency of microorganisms to break free from a biomass to seek out more favorable conditions for growth and propagation elsewhere. In general, some degree of sloughing may be occurring at all times. However, when a biomass becomes too great in quantity for its environment (i.e., environmental resources are to scarce to support the biomass), when fluid flow through the reactor becomes so great in velocity that it break the biomass free from its substrate, or when too high a proportion of the biomass is dead microorganisms (as would be typical during the decline phase), then a "sloughing event" may occur in which a large quantity of biomass breaks free from its substrate. A sloughing event may introduce large coagulations of microorganisms into the reactor and adjoining process units. The resulting clumps of microorganisms may clog filters, pumps, and other process units. Also, the effluent containing the sloughed material may be out of acceptable control parameters for the effluent of the system. Therefore, sloughing events generally are considered undesirable and are to be avoided. A less efficient approach is to accept sloughing as characteristic of the system and periodically remove the sloughed bacteria sludge from the system.

Another disadvantage of previous microorganism-based reactor processing of waste organic matter is that the metabolism of cellulose and hemi-cellulose often is difficult to accomplish. Both cellulose and hemi-cellulose generally are not able to be absorbed directly through the cell wall or membrane of a microorganism. Therefore, these compounds first may need to be partially metabolized or hydrolyzed outside of the microorganism in order to provide the energy and molecular structures that the microorganism needs. For example, in the case of cellulose, a triple enzyme cocktail is required to reduce cellulose to simple sugars that then are capable of penetrating the cell wall or membrane of the microorganism. Because more readily digestible compounds often are found in waste organic matter, microorganisms may favor metabolism of the other compounds over metabolism of the more-difficult cellulose and hemicellulose. Therefore, typical treatment processes may be ineffective at processing the cellulose and hemi-cellulose found in waste organic matter, particularly wastewater (i.e. sewage) and sludge.

A further disadvantage of microorganism-based reactor processing of waste organic matter is that the phosphorus, nitrogen, potassium, and sulfur that are incorporated as nutrients into the microorganisms eventually become waste in sludge that is a by-product of the process. This adds bulk to the sludge, which is expensive to dispose of. Therefore, it is desirable to decrease the amount of the nutrients that is present in the sludge.

Embodiments of the present invention provide systems for efficiently treating waste materials without residual sludge that must be periodically removed from the system. These systems also provide efficient digestion of cellulose and hemicellulose and other organic materials. The efficiency of these systems is maintained through the use of a highly efficient reactor configurations and through a method of maintaining the potency of the reactor biomass. By controlling and maintaining the biomass, embodiments of the invention may reduce or eliminate the problems and disadvantages noted in regards to the use of biomasses in reactors to metabolize, treat, or process waste organic matter. For example, the method may be used to return a stationary or decline stage biomass to the desired log stage. The method also reduces the tendency of the biomass to undergo sloughing events. Furthermore, the method enhances the biomasses ability to metabolize cellulose and hemicellulose.

Figure 2:
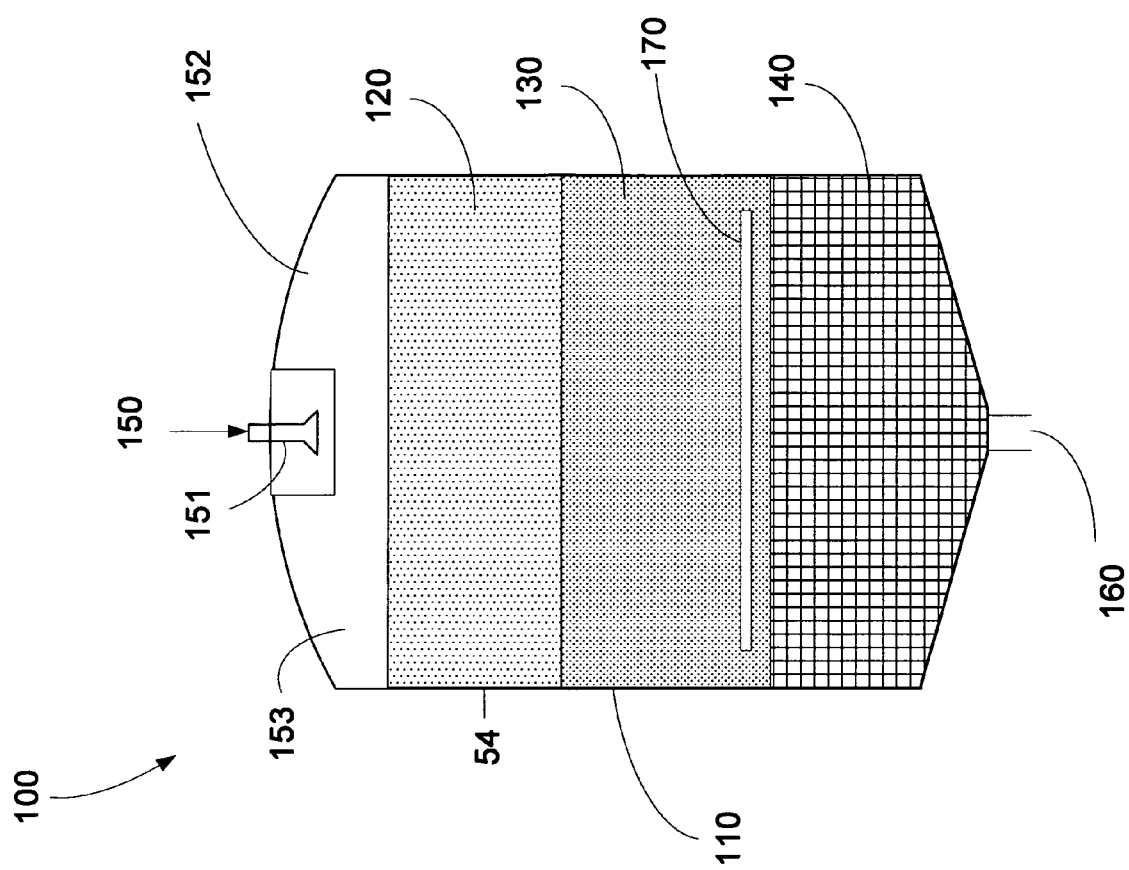
FIG. 2 is a schematic illustration of a bioreactor that may be used in conjunction with the methods and systems of the invention.
Figure 3:
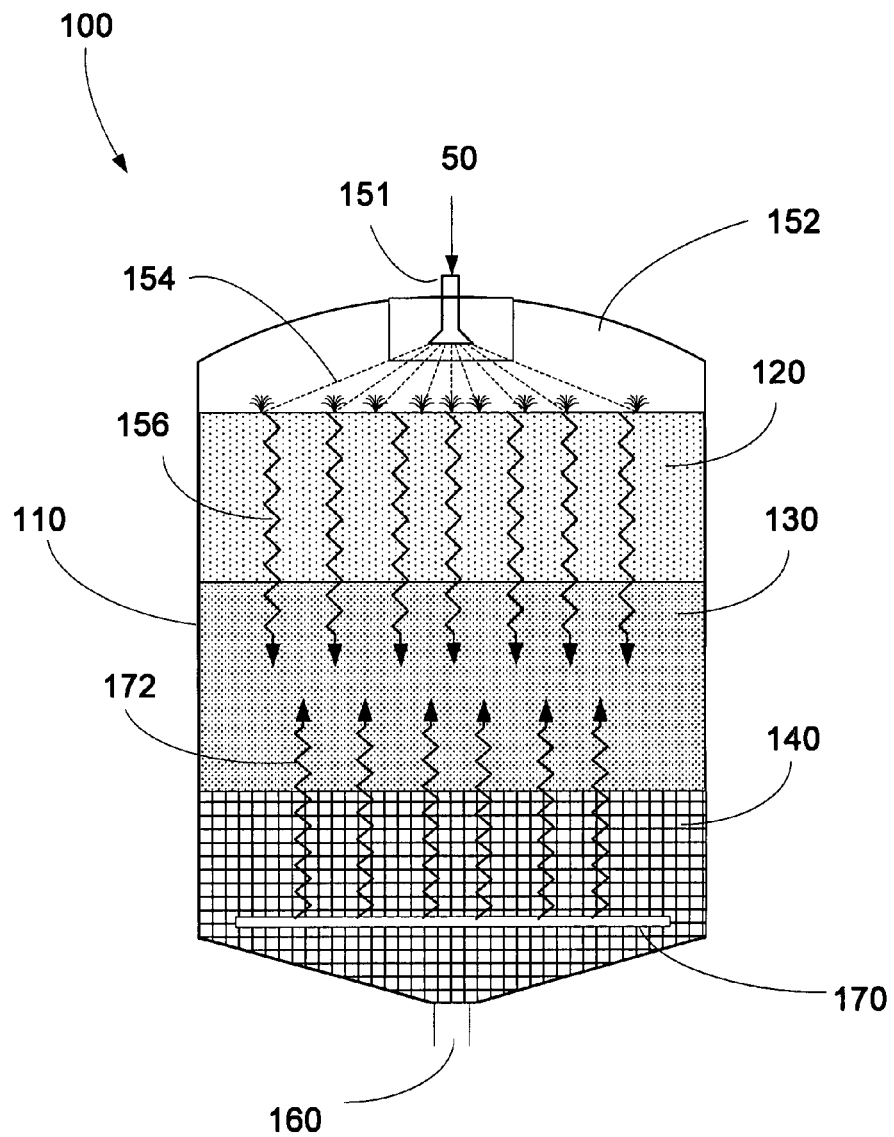
FIG. 3 is a schematic illustration of the operation of the bioreactor of FIG. 2.

FIGS. 2 and 3 illustrate a reactor 100 that may be used in or in conjunction with embodiments of the invention. The reactor 100 comprises a tank 110 having a fluid inlet 150 and exit 160. The tank 110 may have disposed therein a series of strata comprising materials intended to support a microorganism biomass. In the illustrative embodiment shown in FIGS. 2 and 3, a first biomass substrate layer 120 is supported by a second substrate layer 130, which in turn is supported by a base layer 140. The tank 110 and substrate layers may be configured so as to leave a space 152 above the first substrate layer at the top of the tank 110. The substrate and base layers are configured to allow a waste material fluid 156 to be pulled by gravity downward through each stratum. In a typical arrangement, the base layer 140 is formed from tile rock or similar material. The first and second substrate layers 120, 130 are formed from materials selected for their ability to provide a medium for microorganism attachment and growth. Typical materials may include media balls sized and configured to establish a particular surface area and microorganism density.

It will be understood that in some embodiments, the reactor 100 may have only a single substrate layer or may have more than two substrate layers. In reactors with multiple layers, a first substrate layer 120 may comprise a first material and/or medium configuration while a second substrate layer 130 comprises a second material and/or medium. This allows the tailoring of the reactor 100 for digestion of particular waste material constituents. Similarly, the depth of each layer may be varied. In an illustrative example, a reactor 100 may have a 3000 gallon tank 110 having disposed therein a first substrate layer 120 comprising three-quarter-inch diameter media balls, a second substrate layer comprising pea gravel and a base layer comprising tile rock. The first substrate layer may be formed with a depth of 2.5 feet, the second substrate layer may be formed with a depth of 6.0 feet and the base layer may be formed with a depth of 6.0 feet.

While not desiring to be limited thereto, it is thought that arranging the media of the substrate layers to be the decreasing in size from the top of the tank downward may be advantageous in several ways. One possible advantage is that the decreasing size of the substrate provides an increasing surface area to which the biomass and waste organic matter may be adsorbed. Therefore, the decreasing size of the substrate in the tanks may provide an increased opportunity for the microorganisms to metabolize the waste organic matter. Additionally, it is thought that the different sized substrates may cause different velocities of the liquid across the substrate surface, which also may affect the ability of the microorganisms to metabolize the waste organic matter in the liquid.

In operation, waste material is introduced into the tank 110 through the inlet 150 and is allowed to pass downward through the strata. Effluent material is drawn out through the fluid exit 160. The reactor 100 may be used in a continuous flow or pulse-flow process or may be used in a batch process in which waste material is continually recirculated through the reactor 100. As will be discussed in more detail below, the reactor 100 may also be used in series or parallel with other reactors.

The substrate materials used in the reactor 100 may comprise any applicable biological media that provide a substrate for growth of the reactor biomass. Exemplary substrate materials include, but are not limited to: lava stone; ceramic beads; plastic Jaeger Tri-Packs®, available from Jaeger Products, Inc., Houston, Tex.; and so forth. Other materials may include quartzite, and clean, sharp, and graded hammer milled glass (including recycled glass).

Substrate material may be selected to provide a large surface area to which the microorganisms comprising the biomass may adsorb and interact with oxygen and waste organic material. This allows the reduction in size of the reactor(s) required for a given rate of influent to be treated (i.e., is more efficient), reduces the size of the plant, and, thereby, reduces capital costs.

The reactor 100 and its operation may be adapted to increase oxygen availability and thus enhance biomass digestion efficiency. One novel way this may be accomplished is to control the liquid level in the reactors so that an airspace is maintained at the top of the tank 110. This assures that the influent waste material is passed through the airspace before encountering the first substrate layer 120 and the microorganisms disposed therein. Because of the gap between the inlet 150 and the first substrate layer 120, the influent splashes onto the substrate, which results in oxygen being added to the influent. In some embodiments, this aeration effect may be increased through the use of a nozzle 151 configured to spray the influent in a series of streams 154 that splash onto the substrate as shown in FIG. 3. If desired, additional air may be added to the tank 110 using, for example, a blower in order to further aerate the waste material liquid.

The airspace at the top of the tank need not be coextensive with the space 152 between the first substrate layer 120 and the top of the tank. The fluid level in the tank 110 may, for example, be established so that a portion of the media substrate(s) extends into the airspace thus exposing it to the oxygen in the airspace. The exposure of the media may also enhance the aeration effect of the above-described splashing.

Improved aeration and oxygen distribution may also be accomplished by increasing the turbulence within the waste material flow through the substrate layers. One way this can be accomplished is by arranging the substrate layers so that the first substrate layer 120 comprises larger diameter media than the second substrate layer 130. This creates a degree of turbulence in the influent as it flows more rapidly through the top media (which has larger void spaces) and slows as it passes through the smaller media.

Aeration of the influent improves the reactor's ability to metabolize the waste organic material. Other potential benefits of the aerating nozzle and the creation of turbulence in the flow is that they may help to prevent clogging and delay sloughing events. A further potential benefit of the open airspace at the top of the tank is that it provides a path for carbon dioxide that is produced by the metabolic reactions taking place in the tank to escape.

Aeration may also be accomplished by blowing air into the lower regions of the tank 110. This serves to add oxygen to the system and also serves to "froth" the effluent at the bottom of the tank. This frothing action may assist in breaking up masses of microorganisms at the bottom of the tank that might otherwise break lose as a large mass and clog or plug the tank or other process units in the system. As shown in FIGS. 2 and 3, air 172 may be selectively introduced into the bottom of the tank 110 using a frothing manifold 170 or other similar mechanism. Frothing may be effected at periodic intervals or when process parameters meet certain predetermined criteria. These criteria as well as the duration and volume of air applied will be a function of the waste material and the characteristics of the tank.

The reactor 100 may also include an arrangement for water pulsing. In water pulsing, a pulse of tank effluent, clean water, or other liquid is introduced to the tank at or near its bottom, similar to the air frothing. Water pulsing may be useful to break-up masses of inorganic sediment in the tank. Like air frothing, water pulsing may be accomplished at periodic intervals or when process parameters indicate that pulsing should be accomplished.

The reactor 100 may be configured so as to maximize the efficiency of digestion of organic materials in a waste stream. Its efficiency may be further enhanced through operational control and maintenance of the reactor's biomass. As was discussed, above, the performance of a bioreactor is a function of the biomass lifecycle. When the biomass is in its log stage, system performance will be at its peak because it is during that stage that the biomass's ability to digest or metabolize waste organic matter is highest. Because the biomass is logarithmically increasing in quantity during the log stage, large quantities of waste organic matter are broken-down by the biomass to provide the energy and molecular building blocks necessary for microorganism propagation. When the biomass plateaus and begins to decline, organic material metabolism performance decreases.

It can therefore be seen that reactor performance would be improved if the biomass can be kept in the log stage during operation. In the methods of the invention, this is accomplished by periodically removing the reactor from the system's waste treatment process and imposing certain conditions on the biomass. This includes removing all influent waste material and all liquid from the reactor tank. While residual waste material may be present, the only substantial organic material allowed to remain in the tank is that of the biomass itself. As is discussed in more detail below, the imposed conditions (referred to here in as "dry cycle" conditions) force the biomass to feed on itself with the younger, more robust organisms digesting the organic material of the declining or dead organisms. After a certain optimum dry cycle duration, the biomass is left in a condition where only organisms at an early stage in the life cycle remain. Thus, when liquid and waste material are once again introduced into the reactor, the biomass will undergo logarithmic growth and the reactor will operate at a higher efficiency.

The dry cycle will now be discussed in more detail. To initiate a dry cycle, the fluid containing the waste organic matter is drained from the reactor. Air may be introduced to the reactor, for example by a blower, in order to aerate the biomass and preserve, to the extent possible, aerobic metabolism conditions by maintaining a high availability of oxygen. However, it is recognized that some anaerobic conditions may exist in portions of the biomass during the dry cycle. Those of ordinary skill in the art will recognize that this is also the case during the wet cycle.

Because the fluid containing the waste organic matter is removed from the reactor during the dry cycle, the amount of nutrients (e.g., waste organic matter) available to the biomass is greatly reduced. This is thought to lead to a decrease in the rate of metabolism by the microorganisms comprising the biomass and an increase in their rate of death. Because late stage (i.e. stationary and decline stage) microorganisms are less robust than log stage microorganisms, environmental pressures on the biomass are thought to lead to preferred elimination of late stage microorganisms. By removing late stage microorganisms from the biomass, resources such as substrate surface area are freed for the younger, more robust microorganisms.

The removal of nutrients is also thought to initiate an endogenous growth period within the biomass. In other words, the scarcity of nutrients causes the biomass microorganisms to compete among themselves for the reduced amount of nutrients that are available. Moreover, as the older, less robust microorganisms die, they provide food for the remaining microorganisms through lysis. "Lysis" refers to the dissolution of cells or microorganisms such as bacteria. In a biomass undergoing a dry cycle, lysis allows nutrients from dead microorganisms to diffuse out to provide nourishment to the other microorganisms in the biomass.

The result of this endogenous process is a net reduction of the mass. Moreover, the average age of the organisms remaining in the biomass is greatly reduced. These remaining organisms remain healthy because of the nutrients received from the dead and are prepared to enter the log stage upon immersion into a nutrient rich environment. It can thus be seen that the conditions and duration of the dry cycle may be tailored to establish an average age of the microorganisms of the biomass and/or to establish a particular biomass mass.

The conditions during the dry cycle may also be tailored to encourage promulgation of a particular type of microorganism. For example, to encourage the promulgation of thermophilic microorganisms that may be adept at metabolizing cellulose and hemicellulose, it may be desirable to increase the temperature of the biomass during a dry cycle. This may be accomplished by introducing heat from an external source and/or by utilizing the internal heat liberated during the metabolism of the waste organic matter. Whereas during waste processing, the temperature of the biomass may be maintained at levels appropriate for the propagation of mesophilic microorganisms (about 15° C. to about 45° C., and more preferably from about 25° C. to about 35° C.), during the dry cycle, the temperature of the biomass may be maintained at levels appropriate for the propagation of thermophilic microorganisms, or from about 45° C. to about 65° C. Preferably, the temperature of the biomass during the dry cycle is at least about 40° C. in order to facilitate the propagation of thermophilic microorganisms.

The dry cycle conditions may also be tailored to eliminate or reduce the presence of undesirable organisms. For example, the temperature level may be established so as to control certain anaerobic or facultative bacteria.

As discussed above, log stage biomasses will propagate exponentially. Therefore, reducing the quantity of late stage microorganisms in the biomass serves to rejuvenate or revitalize the biomass by facilitating an increase in the relative number of log stage microorganisms. Upon re-introduction of a liquid waste stream (i.e., initiating a "wet cycle") the biomass quickly propagates, providing robust microorganisms to metabolize the organic materials in the waste stream.

It can thus be seen that upon its return to its waste treatment mode, a reactor with a biomass that has undergone a dry cycle will operate at peak efficiency to metabolize waste material. In addition, the post-dry cycle biomass may be particularly well-suited for the metabolism of specific materials such as cellulose and hemicellulose. As discussed above, previous reactor systems have been generally unable to efficiently metabolize cellulose and hemicellulose. Maintenance of the biomass through the dry cycle processing methods of the invention, however, has provided reactors with the ability to break down and digest cellulose and hemicellulose. This is particularly significant given that these are two of the most abundant organic compounds in nature. Cellulose may, in fact, make up as much as 20% of the organics in a typical sewage source.

It has been found that the use of a dry cycle provides a biomass that efficiently metabolizes cellulose and hemicellulose during waste material treatment. It is also hypothesized that during the dry cycle itself the younger microorganisms of the biomass may metabolize the available cellulose and hemicellulose of the dead microorganisms in lieu of other nutrients they otherwise would prefer. In particular, it is thought that cellulose and hemicellulose may be obtained by lysis from dying or dead microorganisms, such as microorganisms that may have been dislodged during a sloughing event from an upstream process unit or reactor.

Furthermore, it is believed that the highly aerobic conditions experienced by the biomass during the dry cycle due to the introduction of air into the reactor may encourage the growth of those particular microorganisms that are more efficient at metabolizing cellulose and hemicellulose. For example, the bacteria *Bacillus, Cellulomonas, Clostridum, Corynebacterium, Cytophaga, Polyangium, Pseudomonas, Sporocytophaga*, and *Vibrio* are recognized for their ability to metabolize cellulose. The actinomycetes *Micromonospora, Nocardia, Streptomyces*, and *Streptosporangium* also are recognized for their ability to metabolize cellulose. In regards to hemicellulose, the bacteria *Bacillus, Cytophaga, Erwinia, Pseudomonas*, and *Streptomyces* are recognized for their ability to metabolize the compound. Therefore, without desiring to be limited thereto, it is believed that the environmental conditions experienced by the biomass during the dry cycle may favor the promulgation of these microorganisms, and thus the metabolism of cellulose and hemicellulose that is present in the biomass itself or in the waste material being treated.

It is also believed that the enzymes released by the microorganisms in order to metabolize cellulose and hemicellulose are circulated throughout the treatment system when the reactor returns to the wet cycle following the dry cycle. Thus, metabolism of cellulose and hemicellulose may be enhanced throughout the system.

Another possible advantage of the use of a dry cycle maintenance method is that inorganic elements such as nitrogen, sulfur, phosphorous, and potassium may be released into the effluent stream of the reactor rather than entrained into a sludge by-product. In the dry cycle method, these elements may be released by the dying microorganisms in the biomass during the dry cycle. When fluid is then re-introduced into the reactor, these minerals are washed out of the reactor in a state of mineralization. This effectively decreases or eliminates residual sludge in the reactor. If necessary, downstream treatment may be used to reduce the levels of the mineral elements in the effluent.

The duration of the dry cycle may depend on the characteristics and constituents of the biomass. It may be established so as to obtain the maximum efficiency of the biomass in digesting certain waste materials. In some cases, the duration of the dry cycle may be a tradeoff between the efficiency of a particular reactor and the overall efficiency of a multi-reactor system. For example, it may not be desirable to remove a reactor from a system for the length of time that would be required for that reactor to reach its own peak efficiency. In three and four-reactor processing systems, a typical dry cycle duration may be in a range of 4.0-6.0 hours.

In addition to enhancing reactor efficiency, dry cycle maintenance of the biomass also reduces the likelihood of a sloughing event. This is thought to be due, at least in part, to the reduction in biomass size during the dry cycle, which in turn reduces the competition within the biomass for nutrients and growth space. Reducing the size of the biomass ensures that it is maintained at levels where the quantity of waste organic matter in the influent is sufficient to maintain logarithmic growth. This reduces the tendency of microorganisms in the biomass to break free from the support medium to seek better conditions elsewhere.

The likelihood of a sloughing event is also reduced by the elimination of less robust microorganisms from the biomass. Because the more robust microorganisms may have an increased ability to adhere to the substrate in the reactor compared to less robust microorganisms, increasing the percentage of more robust microorganisms in the biomass may result in the biomass as a whole having increased adhesion to the substrate, and therefore a reduced likelihood to undergo a sloughing event. Reducing the likelihood of a sloughing event also reduces the possibility of the reactor and substrate becoming clogged due to the dislodging of biomass from the substrate.

Yet another advantage of the dry cycle is that the death of a portion of the biomass may result in the release of additional carbon dioxide, which can be removed from the reactor by circulating air therethrough. By facilitating the production and removal of carbon dioxide, the overall amount of carbonaceous material in the system is reduced.

It can be seen that a properly timed dry cycle maintenance period can be used to maintain a reactor at an optimum average efficiency. In order to maximize the duration of the wet cycle (i.e., waste material processing time), it may be desirable to time the initiation of a dry cycle to coincide with the time when the biomass reaches the stationary or decline stage. By then returning the reactor to operation when the biomass (on average) is at the start of the log phase, the overall duration of an efficient wet cycle can be maximized. This may maximize digestion of the waste organic matter by maximizing the time the biomass spends in the fast-growth log stage. Because the method may be used to maximize the period of time the biomass spends in the fast-growth log stage, the method may increase the efficiency of the reactor and any systems and sub-systems in which it is installed.

Various process conditions may be monitored in order to determine when a dry cycle should be implemented on a given process unit or reactor. For example, a dry cycle may be implemented when the biomass has reached a certain quantity, volume, or size. This may be desirable because larger biomasses also may be older, and therefore more likely to be in the stationary or decline stage of growth and in need of maintenance. Additionally, larger biomasses require a greater nutrient input. Given a constant nutrient input, larger biomasses are more likely to engage in sloughing in response to the limited nutrient supply that restricts their growth.

Unfortunately, it is generally difficult to measure the quantity of biomass in a direct fashion. As a result, it may be necessary to measure other variables that are indirectly indicative of the quantity of biomass. One such variable that may be an indirect indicator of the quantity of biomass is the pressure difference between the inlet and the outlet of the reactor. This difference may result from the tendency of the growing biomass to clog the reactor or process unit, leading to an increased pressure drop from the inlet to the outlet of the reactor. Accordingly, when the pressure difference exceeds a set point, a dry cycle may be implemented. Similarly, the load on pumps that are used to circulate the waste organic matter through a reactor or process unit may increase as the reactor or process unit becomes clogged by a growing biomass. Therefore, the load on the pumps may be measured as a means of determining when a dry cycle should be implemented.

Another variable that may be measured to indirectly assess the quantity of biomass in the reactor and when a dry cycle should be implemented is the volumetric flow of fluid through the reactor. For example, when the volumetric flow of fluid decreases to a certain set point, a dry cycle may be implemented. The rate of decomposition of waste organic matter within the process also may be measured to determine when a dry cycle should be implemented. As a biomass ages and increasingly requires maintenance, the rate of assimilation of waste organic matter slows because the old biomass enters the stationary or declines stages wherein it is no longer rapidly growing. Therefore, a reduced rate of decomposition may indicate when a dry cycle should be implemented.

Additionally, the temperature of the reactor or process unit may be measured in order to determine when a dry cycle should be implemented. Heat is a by-product of the decomposition and metabolism of organic matter. Therefore, a reduction in operating temperature of a reactor or process unit may indicate that the rate of decomposition/metabolism has decreased and that a dry cycle should be implemented in order to rejuvenate and maintain the biomass.

Still another variable that may be measured is the volumetric displacement of the biomass in the reactor or process unit. This may be particularly applicable in a batch process wherein a reactor or process unit is repeatedly filled with waste organic matter that then is processed and drained from the reactor. The volume of waste organic matter that may be pumped into the reactor until it is filled may be compared from batch-to-batch, a lower volume being indicative of a larger biomass within the reactor or process unit. Therefore, when the volume of waste organic matter that can be placed within a reactor or process unit has reached a sufficiently low set point, a dry cycle may be implemented, which may reduce the quantity of biomass in the reactor or process unit and result in an increase in waste organic matter than can be placed within the unit.

It will be understood that a set of criteria for initiating a dry cycle may be constructed based on various combinations of the above indicators. It will also be understood that the methods of the invention are not limited to reactors having the configuration described above. The dry cycle maintenance methods of the invention may be applied to any waste treatment bioreactor.

It will also be understood that dry cycle maintenance may be utilized in a number of different applications that involve the processing of organic and inorganic compounds by microorganisms including, but not limited to, the treatment of farm waste, wastewater treatment, sludge treatment, leachate treatment or cracking, the treatment of organic industrial waste, breeding of microorganisms for the stabilization of radionucleotides, breeding of microorganisms for the stabilization of heavy metals, and so forth. In any of these applications, a dry cycle may be used to maintain the appropriate biomass for the application, increase the efficiency of the reactor and any systems and sub-systems in which the reactor is installed, and decrease the likelihood of a sloughing event, among other advantages.

Illustrative embodiments of the invention provide systems for waste material processing. These systems may be adapted for processing sewage, sludge or other waste materials. Sludge is a by-product of many primary and secondary industrial waste treatment facilities, in particular POTWs. Generally, sludge is in the form of either concentrated wet sludge with approximately 3% biosolids, or dry cakes with approximately 20% biosolids. In either case, sludge biosolids generally is composed of about 80% organic materials and 20% inorganic materials. The sludge treatment systems disclosed herein may be applicable to the treatment of both wet sludge and dry cake sludge in a variety of different compositions. Processing of dry cake sludge, would, of course, require that water be added to the sludge to provide a processable fluid.

A waste material processing system or module may comprise any number of interconnected reactors. However, in one approach to implementing the dry cycle methods of the invention, such a system would have at least two reactors so that there is always one or more reactors available for processing waste while one or more other reactors undergo a dry cycle. In the exemplary waste processing system 200 illustrated in FIG. 4, three reactors 210, 220, 230 are interconnected to form a 3-tank processing module. The tanks are arranged so that an influent waste material fluid 22 such as sludge may be selectively delivered to the tanks through a piping manifold 240. Recycle piping 242 from the outlet of each of the reactors allows the liquefied waste composition to be re-circulated through the reactors until an appropriate treatment has been accomplished. For a sludge treatment system, for example, the waste material fluid may be processed until about 85% of the organics in the sludge have been metabolized. When the liquefied waste material has been appropriately treated, the effluent 23 may be drained from the system and the process repeated. In this way, the 3-tank configuration may function as a batch-wise treatment system. In an alternative method, the system may be operated in a pulse-batch manner in which the waste material is processed until the appropriate parameters (e.g., total suspended solids (TSS)) have been met. Then, a small amount of effluent is allowed to exit the system and a small amount of influent is added to the system.

Whether operated in a batch-wise or pulse-batch manner, any or all of the three reactors also may selectively be drained and its biomass subjected to a dry cycle as described herein. Dry cycles may be imposed, for example, at the end of every batch of sludge that is processed, or at some other periodic interval such as daily or weekly. In an alternative embodiment, the dry cycle may occur in response to the variables discussed herein in reference to the dry cycle method (e.g., load on the pumps, volumetric displacement, pressure differential, volumetric flow rate, rate of decomposition, temperature of the reactor/tank).

In an exemplary method of processing sludge using the 3-tank material processing system 200, the sludge first may be liquefied, if necessary, and/or diluted until it reaches a TSS level of less than about 10000 mg/L. In some embodiments, it may be preferred to dilute the sludge until a level less than about 5500 mg/L is reached. It should be noted, however, that too dilute a mixture of sludge may result in unnecessarily slow treatment of the sludge. This is because the concentration of waste organic material may be insufficient to maintain the biomass in the logarithmic growth phase. It may therefore be preferred that the sludge be diluted to a TSS of less than 5500 mg/L but no less than about 2500 mg/L.

Waste material fluid may be fed to the system as influent and loaded into the reactors serially (i.e., first filling tank 210, then tank 220, then tank 230) or in parallel (i.e., to tanks 210, 220, and 230 simultaneously). If filling serially, the rate of filling may equal the appropriate flow rate for the waste material through the tanks so that it is partially treated as it travels from one reactor to the next. However, if applicable, parallel loading of the waste material may be desirable because of the increased speed with which the system may be charged. A possible disadvantage of parallel loading is the potential for clogging or plugging of reactors containing smaller substrates in their internals.

It will be understood that there are many possible variations in the loading and processing sequence. For example, in one particular sequence, small amounts (e.g., 500-1,000 gal.) of sludge may be pumped into the first tank 210 at specific intervals selected by the operator. Air may be introduced at the bottom of the tank to keep the high volatile organics at the top and actively digesting. At the same time intervals, the same amount of material may be removed from the first tank 210 and introduced into the second tank 220. The material in the second tank 220 may be continually circulated from the second tank 220 to the third tank 230 and back to the second tank 220. At the selected intervals, material is removed from the second tank 220 and/or the third tank 230, with the amount of the material equaling the amount of newly introduced material from the first tank 210.

This keeps the concentration of sludge even in the first tank 210 while removing growth inhibitors from the bottom of the tank. It also maintains a lower concentration of organics in the second and third tanks 220, 230, thus allowing them to develop a desired ecology.

Once the desired amount of waste material has been added to the system 200, the system may be closed and the waste material re-circulated through the three tanks and processed, metabolized, or digested by biomasses inside of the tanks. A control system may monitor and control variables such as pH, temperature, TSS, and dissolved oxygen (DO). In a preferred embodiment, the pH of the system may be maintained within the range from about 6.0 to about 8.0, and more preferably at about 7.0. In another preferred embodiment, the DO may be maintained at levels above about 2.0 mg/L. More preferably, the DO of the influent may be maintained at levels from about 3.5 mg/L to about 5.0 mg/L.

In still another preferred embodiment, during the wet cycle the temperature of the system may be maintained at levels appropriate for the propagation of mesophilic microorganisms, or from about 15° C. to about 45° C., and more preferably from about 25° C. to about 35° C. During the dry cycle, the temperature of the system may be maintained at levels appropriate for the propagation of thermophilic microorganisms, or from about 45° C. to about 65° C. Preferably, the temperature of the system during the dry cycle is at least about 40° C. in order to facilitate the propagation of thermophilic microorganisms. Higher temperature during the dry cycle may be desirable in order to facilitate the metabolism of cellulose and hemicellulose.

Other variables that may be monitored and controlled are the presence of nitrogen, phosphorous, potassium, and sulfur. This may be desirable because these elements commonly are necessary nutrients for microorganisms.

The reactor internals for the three reactors 210, 220, 230 may be designed to provide an appropriate substrate for the biomasses to attach to, encourage aeration, and facilitate complete mixing of the compositions within the tanks. The reactors 210, 220, 230 may each be configured in a manner similar to that of reactor 100 of FIGS. 2 and 3. It will be understood that each tank may have one or more substrate layers in addition to a base layer. In the illustrated system 200, each tank comprises a single substrate layer supported by a base layer. It will be understood, however, that the specific internal configuration of the tanks may be different. For example, in a particular embodiment, all three tanks 210, 220, 230 may have an eight foot deep substrate layer and a two foot deep base layer of tile rock. The substrate materials, however, may be different. The substrate material of the first tank 210, may comprise 3-inch diameter media balls, such as those commercially available from Jaeger Products, Inc., Houston, Tex. The substrate layer of the second tank 220, however, may be a mixture of 1-inch, 1.5-inch, and 2-inch media balls while the substrate layer of the third tank 230 is a mixture of 1-inch and 1.5-inch media balls. One skilled in the art will appreciate that other combinations of media substrate materials may also be used and that other materials may be used in place of the tile rock.

Figure 5:
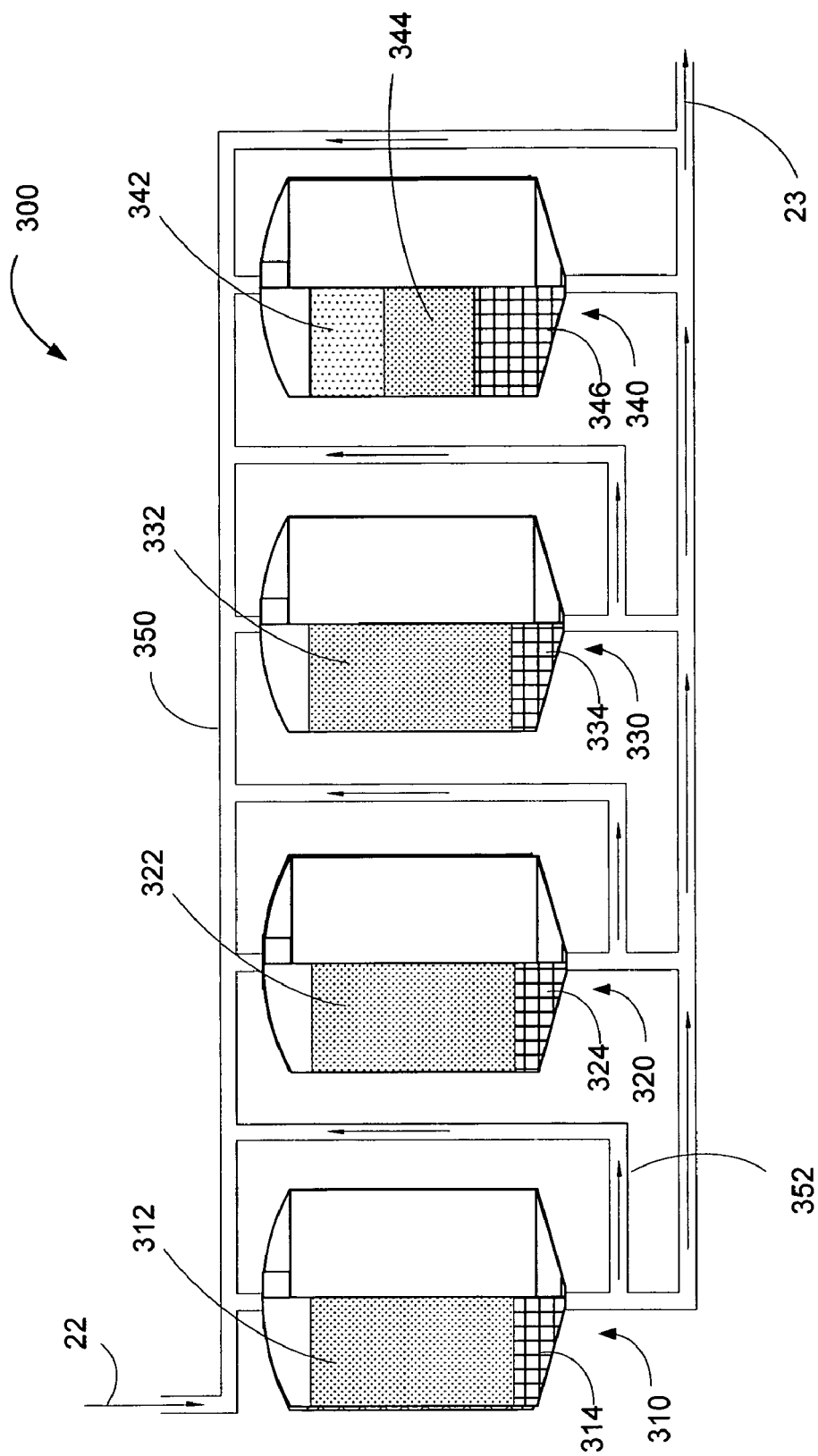
FIG. 5 is a schematic illustration of a waste processing system according to an embodiment of the invention.

FIG. 5 illustrates an alternative embodiment of a waste processing system. The exemplary waste processing system 300 of FIG. 5 comprises four reactors 310, 320, 330, 340. Like the 3-tank configuration, the 4-tank configuration may deliver a waste material fluid 22 such as sludge through a manifold 350 to the reactors 310, 320, 330, and 340. Recycle piping 352 from the outlet of each of the reactors allows the process liquid to be recirculated within the system. An effluent fluid 23 may be drained from the system once the sludge has been processed as desired. In this manner, the 4-tank dry cycle sludge treatment system may operate in a batchwise fashion. The system may also be operated in a pulse-batch manner as previously described for the three-tank system 200.

The 4-tank waste system 300 can be operated in several ways. In one method of operation, all four reactors 310, 320, 330, 340 may be operational at the same time unless or until it is determined that one or more of the reactors 310, 320, 330, 340 should be removed from the system 300 (i.e., isolated from the other reactors) and subjected to dry cycle conditions. Upon completion of the dry cycle, the rejuvenated reactor or reactors can be returned to the system 300. Criteria for removing a reactor from the system 300 to undergo a dry cycle may be based on measured reactor conditions or based on an operational time limit.

In a particular method of operating waste processing system 300, only three of the reactors 310, 320, 330, 340 are processing waste at any given time, while the fourth reactor is isolated and subjected to a dry cycle. The three operational reactors effectively provide a three-tank subsystem that may be operated in a batch manner like the previously described 3-tank system 200. For example, a batch of sludge or other waste material may be processed until the TSS is about 150 mg/L or some other variable has reached a desired level. The three operational reactors may be loaded with serially or in a parallel manner. In the meantime, the fourth reactor is subjected to dry cycle conditions for maintenance of the biomass disposed therein. In this way, each tank in the 4-tank processing system 300 may be subjected to dry cycle maintenance condition during every fourth batch of waste material.

Figure 4:
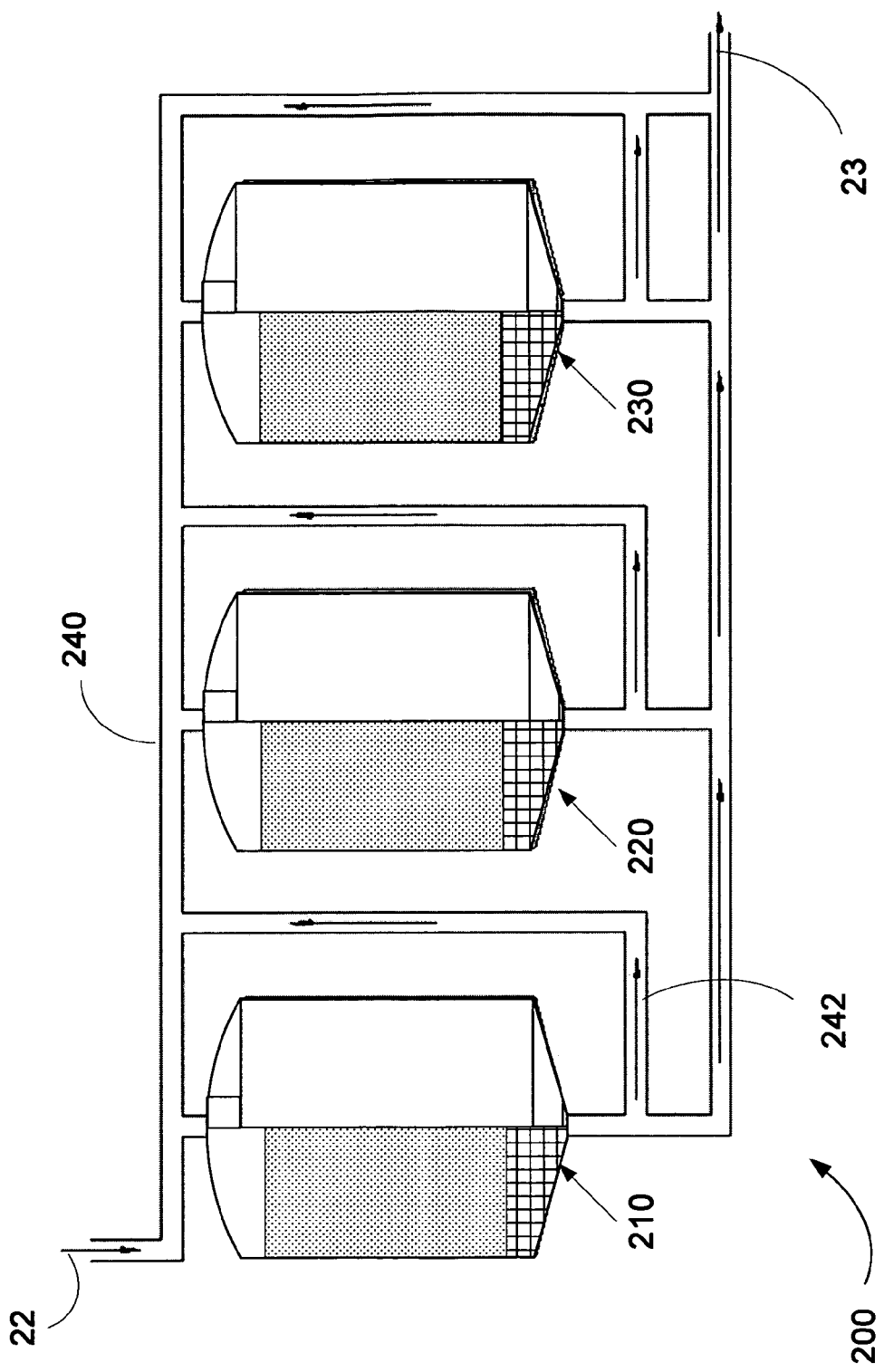
FIG. 4 is a schematic illustration of a waste processing system according to an embodiment of the invention.

If desired, the four reactors 310, 320, 330, 340 of the waste processing system 300 may have internals configured in a manner similar to that of the reactors in the 3-tank configuration of the waste processing system 200 shown in FIG. 4. As in the system 200, each tank of the four-tank system 300 may comprise one or more substrate layers supported by a base layer. The configuration of all four tanks may be the same or some or all of the tanks may be different from the other tanks. In the embodiment illustrated in FIG. 5, each of the first three reactors 310, 320, 330 has a single substrate layer while the fourth reactor 340 has two substrate layers. In a particular example system, each of the first three reactors 310, 320, 330 has an eight foot deep substrate layer 312, 322, 332 and a two foot deep base layer of tile rock 314, 324, 334. The substrate layer 312 of the first reactor 310 comprises 3-inch diameter media balls, the substrate layer 322 of the second reactor 320 comprises a mixture of 1-inch, 1.5-inch, and 2-inch media balls, and the substrate layer 332 of the third reactor 330 is a mixture of 1-inch and 1.5-inch media balls. The fourth reactor 340 has a first (uppermost) substrate layer 342 that is 2.5 feet deep, a second substrate layer 344 that is 3.0 feet deep and a tile rock base layer 346 that is 3.0 feet deep. The first substrate layer 342 comprises ¾-inch media balls and the second substrate layer 344 comprises #67 round gravel.

Figure 6:
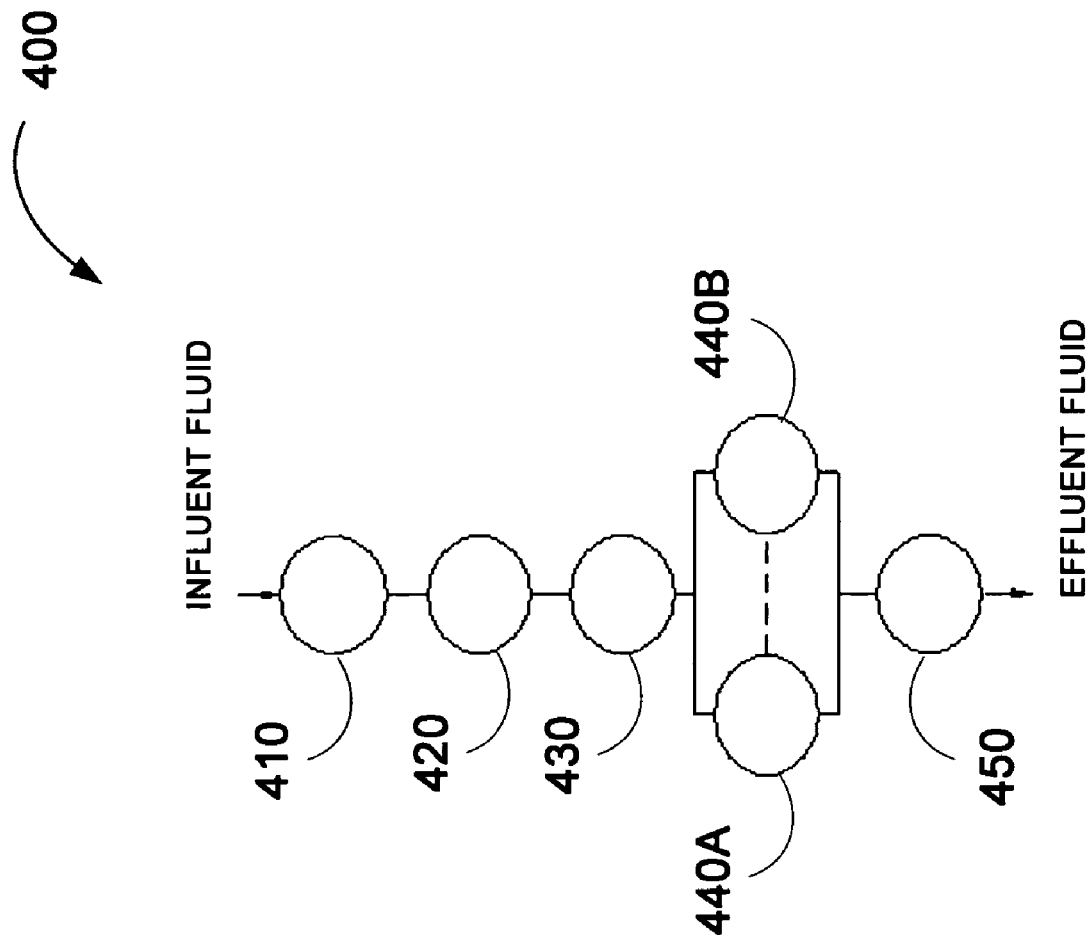
FIG. 6 is a flow diagram of a waste processing system according to an embodiment of the invention.

With reference to the schematic illustration of FIG. 6, another embodiment of the invention provides a waste material processing system 400 that may be particularly efficacious in the treatment of sewage. The system 400 comprises a plurality of bioreactors connected in series, each reactor representing a stage in the processing of the waste material and each being in fluid communication with its predecessor. In the illustrated example, the first three processing stages are accomplished by passing the influent waste material sequentially through each of three reactors 410, 420, 430. These reactors, each having a microorganism biomass disposed therein, may be configured in a manner similar to the reactor 100 of FIGS. 2 and 3 or may have a different configuration. In a typical embodiment, each of these reactors may have a different internal configuration, is provided with a different form of microorganism, or has a different substrate size or configuration. The fourth stage of processing is accomplished by one of a pair of reactors 440A, 440B. The system is configured so that at any given time, only one of the reactors 440A, 440B is in fluid communication with the previous reactor 430 for processing effluent therefrom. The other reactor of the pair is isolated from the system so that it may be subjected to dry cycle conditions. The reactors 440A, 440B may be configured in the same manner as the reactor 100 of FIGS. 2 and 3. Each may have specific internal and biomass characteristics tailored to process both the waste material stream as processed by the upstream reactors and to process sloughed biomass material from those reactors. The characteristics of the reactors 440A, 440B will typically be identical. The waste processing system 400 may also have a filter 450. The filter 450 may be a zeolite filter or any other off-the-shelf filtration device or system.

In operation, a continuous flow of an influent fluid containing organic waste material is sequentially passed through reactors 410, 420, 430 and the active member of the alternating pair of reactors 440A, 440B. The alternating reactors 440A, 440B may be periodically rotated between operational waste treatment and dry cycle modes. By maintaining the final reactor in the series at peak efficiency, biomass material resulting from sloughing events from the upstream reactors 410, 420, 430 can be easily managed and removed from the waste material stream. The filter 450 can then be used to catch any residual material in the effluent from the alternating reactors 440A, 440B.

In an exemplary embodiment of the waste processing system 400, the upstream reactors 410, 420, 430 may have the same internal configuration and substrate materials as the exemplary embodiment described above for the first three reactors 310, 320, 330 of the waste processing system 300. Each of the alternating reactors 440A, 440B may have the characteristics of the exemplary embodiment described above for the fourth reactor 340 of the waste processing system 300 of FIG. 4.

The alternating reactors 440A, 440B may be rotated between wet and dry cycles in a periodic manner in order to maintain their biomasses at an optimum growth stage. The shift of the stream from one of the reactors 440A, 440B to the other may be made after predetermined intervals or may be made based on observed parameters meeting predetermined criteria. Such criteria may, for example, be tied to the observation of changes in flow or other parameters that suggest a sloughing event has occurred in one of the upstream reactors 410, 420, 430. Based on observation of such an event, the system may operate to shift to whichever of the two reactors 440A, 440B is better able to process the sloughed material. Preferably, the reactors 440A, 440B are cycled in a manner such that neither is required to handle two consecutive sloughing events.

As a result of periodic dry cycle maintenance, it is expected that sloughing events in the alternating reactors 440A, 440B will be minimized or eliminated. Nevertheless, the additional filter 450 may be configured to screen out any biomass remaining in the effluent fluid after processing by the reactors 440A, 440B.

Other control parameters, such as when the dry cycle should be implemented, dry cycle duration, temperature, pH, DO levels, TSS, and so forth may be controlled as has been explained in reference to a dry cycle sludge treatment system.

It will be understood that a sequential system such as the waste treatment system 400 is not limited to a particular number of reactors. For example, such a system may comprise any number of upstream reactors (i.e., one or more). Such a system may also rotate between more than two reactors at the final stage of bio-processing.

A sewage treatment system using dry cycle maintenance methods may be implemented in much the same way as a traditional sewage treatment plant. For example, headworks such as a bar screen, grit removal, and settlement and equalization tanks may be employed to remove large media from the sewage influent before processing by the system. Tertiary filtration (e.g., using a micron filter), chemical and ultraviolet disinfection systems, equalization systems, nitrification/denitrification systems, flocculators, and clarifies also may be used in conjunction with the dry cycle system.

The treatment systems of the invention may be used as an adjunct to an existing wastewater treatment facility. For example, any of these systems may be implemented as a pre-treatment process in order to reduce the overall organic load on an existing facility. The systems of the invention may be particularly well-suited for use as a pre-treatment process because the higher concentration of biosolids at the pre-treatment stage may be more suitable for these systems.

The systems of the invention may also be used to replace or augment a process unit within an existing wastewater treatment facility. Again, because a high concentration of biosolids may be more appropriate for processing in the high efficiency processing systems of the invention, it may be desirable to connect them to a point in an existing sewage treatment facility where the bio-solids in the waste stream are concentrated to at least about 0.3% of the effluent. For example, a high efficiency system according to the invention may be connected near the bottom of an existing sewage plant's aeration tanks located off of the primary clarifier. The high efficiency system may be configured to eliminate more than 85% of the organic matter in the waste stream, which subsequently may be returned to the existing facility for further processing. As demonstrated in the examples below, TSS may be reduced below 150 mgs/L for an influent having an initial TSS on the order of 4000 mgs/L. Reductions in total suspended solids as high as 97% have been achieved.

The methods and systems described herein may provide other benefits in addition to the superior performance in terms of reduction in the amount of waste organic matter. Whereas traditional sludge and sewage treatment processes are large, expensive to build, and expensive to maintain, the systems described herein may have a relatively small footprint area (comprising mostly tanks, pumps, and simple piping and control systems), may be relatively inexpensive to build, and may be relatively inexpensive to maintain. In some cases, the sludge and sewage treatment processes described herein may be distributed as "package" plants, comprising the tanks, piping, pumps, valving, control systems, and so forth that may be necessary to build and operate one of the systems.

The methods and systems of the invention may be used in conjunction with an estuary. It is well known in ecology that most of the carbon dioxide that is fixed into organic carbon and inorganic sediment such as sedimentary rock having high amounts of carbonates are formed in estuary areas. Further these areas are responsible for fixing highly mobile plant nutrients such as nitrogen and phosphorous. Many communities around the world now use estuary areas to tie up or fix highly mobile nutrients such as nitrogen and phosphorous. The use of an estuary area with the systems of the invention may fix or tie up nitrogen and phosphorous sufficient to allow communities to lower their output of nitrogen and phosphorous. This may be especially important in areas where the release of these nutrients is forbidden by law. Such a combined system may allow a community to develop carbon credits that it could provide to industry to comply with the Kyoto Accord, which requires signing countries to lower their carbon dioxide emissions.

The effectiveness of the invention will now be described in reference to the following examples.

Table 1 illustrates the performance of a three-tank sludge processing system configured as described above for the processing system 200 of FIG. 4. The system included three 3,000 gallon tanks with media substrates configured as described for the exemplary configuration of the processing system 200. For each batch, the tanks were sequentially loaded and unloaded. Eight batches (representing a day's processing run) were run following application of a dry cycle conducted for all three tanks. The results show that organic material removal performance was in a range from about 93% to about 97%.

TABLE 1

Sludge treatment, effectiveness of organic reduction

| Batch Number | Gallons Processed | TSS, In (mgs/L) | TSS, Out (mgs/L) | Organic Reduction |
|---|---|---|---|---|
| 1 | 2,052 | 3,724 | 212 | 94.3% |
| 2 | 2,463 | 4,348 | 137 | 96.8% |
| 3 | 2,370 | 4,088 | 156 | 96.2% |
| 4 | 2,202 | 3,600 | 154 | 95.7% |
| 5 | 1,908 | 3,912 | 259 | 93.4% |
| 6 | 1,962 | 3,808 | 266 | 93.0% |
| 7 | 2,140 | 3,756 | 180 | 95.2% |
| 8 | 2,059 | 3,800 | 133 | 96.5% |
| Total Gallons for Day | 17,156 | | | |
| Average Per Batch | 2,145 | 3,880 | 187 | 95.1% |

The performance of exemplary sludge processing systems that implement the dry cycle maintenance methods of the invention have been shown to far exceed the performance of prior art systems. Table 2 illustrates performance results for the above-described three-tank system in which dry cycle maintenance methods were applied. The results for the system, which was operated in a batch mode with 1600 gal. per batch, are shown along with comparable results for standard anaerobic, high rate anaerobic, and aerobic treatment processes.

TABLE 2

Solids removal performance of dry-cycle sludge treatment process

| Sludge Treatment Process | % VSS Reduction | Typical VSS Solids Loading Rate (lbs/cu. ft/day) | Hydraulic Detention Time (days) |
|---|---|---|---|
| Standard rate anaerobic | 40-50 | 0.03-0.01 | 30-90 |
| High rate anaerobic | 40-50 | 0.10-0.40 | 10-20 |
| Aerobic | 40-50 | 0.10-0.20 | 16-18 |
| Aerobic system with dry cycle maintenance | 80-97 | 0.26-0.35 | 0.8-1.0 |

As shown in Table 2, the dry cycle sludge treatment processes described herein may perform significantly better than standard aerobic and anaerobic treatment systems for the processing and treatment of sludge. The percentage reduction in volatile suspended solids (VSS) in the dry cycle sludge treatment processes may be between about 80% and about 97%. In a typical sludge, this may translate into a total reduction in sludge volume by about 68% to about 72%. Table 2 also demonstrates that the loading rate per cubic foot of the dry cycle sludge treatment processes exceeds that of the typical treatment processes currently in use. Finally, Table 2 demonstrates that the detention time of the dry cycle sludge treatment processes are greatly reduced versus current treatment process.

Sludge processing systems according to the invention have also been found to be highly successful with respect to nitrogen removal. Table 3 illustrates the difference in nitrogen content between the influent waste material and the processed waste material in the third system tank prior to removal form the system. The data illustrate nitrogen removal over the course of six waste material batches processed through the three-tank system described above. A review of these results shows that the system provides a consistent order of magnitude reduction in total nitrogen.

TABLE 3

Nitrogen removal performance of sludge treatment system

| | Total Nitrogen Content (TKN) | |
|---|---|---|
| Batch No. | Influent | Tank 3 |
| 1 | 239.00 | 26.80 |
| 2 | 245.00 | 10.40 |
| 3 | 226.00 | 6.60 |
| 4 | 243.00 | 10.90 |
| 5 | 279.00 | 8.83 |
| 6 | 303.00 | 3.64 |

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method of maintaining a biomass disposed on a substrate in a bioreactor tank, said bioreactor tank having an inlet and an outlet in fluid communication with a waste treatment system whereby an influent fluid may be selectively introduced through the inlet into the bioreactor tank for removal of waste material therefrom to produce an effluent fluid which can be returned through the outlet to the waste treatment system, the method comprising:

processing a quantity of influent fluid through the bioreactor tank to produce a quantity of effluent fluid;

removing the effluent fluid from the bioreactor tank through the outlet;

isolating the bioreactor tank from the waste treatment system;

establishing a set of dry cycle conditions in the bioreactor tank, the dry cycle conditions being selected to effect endogenous growth within at least a portion of the biomass whereby an average age of the at least a portion of the biomass may be tailored; and restoring the bioreactor tank connection to the waste treatment system.

2. A method according to claim 1 wherein the set of dry cycle conditions includes at least one of the set consisting of an internal tank temperature in a predetermined temperature range, an internal tank humidity in a predetermined humidity range, and an internal tank pressure in a predetermined pressure range.

3. A method according to claim 1 wherein the set of dry cycle conditions includes an internal tank temperature of at least about 40° C.

4. A method according to claim 1 wherein the set of dry cycle conditions includes an internal tank temperature in a range from about 45° C. to about 65° C.

5. A method according to claim 1 further comprising:
upon establishing dry cycle conditions in the bioreactor tank, blowing air into the reactor tank to provide additional oxygen to the biomass.

6. A method according to claim 1 further comprising:
determining whether predetermined criteria for initiating a dry cycle have been met,
wherein the actions of processing a quantity of influent fluid and removing the effluent fluid are repeated until a determination is made that the predetermined criteria for initiating a dry cycle have been met, and
wherein the actions of isolating the bioreactor tank, establishing a set of dry cycle conditions, and restoring the bioreactor tank connection are carried out responsive to a determination that the predetermined criteria for initiating a dry cycle have been met.

7. A method according to claim 6 wherein the predetermined criteria include a maximum hydrologic pressure difference between the inlet and the outlet of the bioreactor tank.

8. A method according to claim 6 wherein the action of processing a quantity of influent fluid includes allowing the influent fluid to flow through the reactor tank and recirculating the influent fluid through the reactor tank until a desired waste material content is achieved.

9. A method according to claim 8 wherein the influent fluid comprises a sludge having a suspended solids in a range from about 2500 mgs/liter to about 10000 mgs/liter.

10. A method according to claim 8 wherein the influent fluid comprises a sludge having a suspended solids in a range from about 2500 mgs/liter to about 5500 mgs/liter.

11. A method according to claim 8 wherein the desired waste material content is no greater than 150 mgs/liter.

12. A method according to claim 8 wherein the desired waste material content is no greater than 15% of an influent waste material content.

13. A method according to claim 8 wherein the predetermined criteria include a minimum volumetric flow rate through the tank.

14. A method according to claim 8 wherein the predetermined criteria include a minimum waste material removal rate.

15. A method according to claim 6 wherein the predetermined criteria include a maximum operational time interval.

16. A method according to claim 6 wherein the predetermined criteria include a maximum volumetric displacement of the biomass.

17. A method according to claim 6 wherein the predetermined criteria include a maximum temperature inside the reactor tank.

18. A method according to claim 1 further comprising:
maintaining the dry cycle conditions in the bioreactor tank for a predetermined time interval.

19. A method according to claim 18 wherein the predetermined time interval is in a range of about 4.0 hours to about 6.0 hours.

* * * * *